Sept. 1, 1931.     P. W. FLEISCHER ET AL     1,821,700
PAPER BOX MAKING MACHINERY
Filed Feb. 9, 1928     6 Sheets-Sheet 4

INVENTORS
PAUL W. FLEISCHER
AND MARTIN FEYBUSCH,
BY Lotka, Kehlenbeck & Harley
ATTORNEYS.

Sept. 1, 1931.  P. W. FLEISCHER ET AL  1,821,700
PAPER BOX MAKING MACHINERY
Filed Feb. 9, 1928   6 Sheets-Sheet 6

INVENTORS
PAUL W. FLEISCHER,
AND MARTIN FEYBUSCH,
BY
ATTORNEYS.

Patented Sept. 1, 1931

1,821,700

UNITED STATES PATENT OFFICE

PAUL W. FLEISCHER, OF WEEHAWKEN, NEW JERSEY, AND MARTIN FEYBUSCH, OF BROOKLYN, NEW YORK, ASSIGNORS TO NEW JERSEY MACHINE CORPORATION, OF HOBOKEN, NEW JERSEY, A CORPORATION OF NEW JERSEY

PAPER BOX MAKING MACHINERY

Application filed February 9, 1928. Serial No. 252,968.

This invention relates to box making machines of the type employed for the manufacture of pasteboard boxes or cartons such as are commonly used as packages or containers for candy, shoes and other merchandise adapted to be packed in an open topped box. Boxes of this type are usually constructed from pasteboard blanks, scored to provide folding lines upon which the blank is folded to define the bottom and the four sides of the box, after which, paper is wrapped about, and adhesively secured to, the sides to hold the box in "set-up" condition. Heretofore it has been the practice to perform the folding of the box blank and the wrapping thereof by hand methods or to use a machine to which the blank, in flat condition, is fed, then folded, wrapped, and delivered, all of the operations of the machine being entirely automatic. An example of such an automatic machine is shown in U. S. Letters Patent #1,468,146 granted Sepetember 10, 1923 to Martin Feybusch and Sigurd Severson. While machines of the type shown in said patent are very efficient and operate to produce automatically a specified size and style of box at great speed, thereby enabling the box manufacturer to effect considerable savings in labor costs, their more general adoption has been hampered by the factors of high first costs and limited flexibility. Owing to their large number of automatic operations, the completely automatic machines are quite expensive to manufacture and consequently can not be sold at a low enough price to permit many of the smaller manufacturers to purchase them. By the limited flexibility of the automatic machines, which is also due to the large number of automatic operations, is meant, that as a result of the necessity for employing a number of different carefully machined interchangeable parts for each different size of box manufactured, which parts must function accurately with the fixed parts of the machine, not only is the range of the machine as to size and style of boxes limited, but in addition the first cost of such interchangeable parts is relatively high and the changing over of the machine from one size to another requires a considerable amount of time and the employment of skilled mechanics. Consequently, the use of the automatic machines has been restricted to the larger factories which produce large quantities of boxes of standardized sizes.

Conditions in the paper box manufacturing industry are such that by far the greater number of factories manufacture a large variety of boxes, usually in relatively small quantities, which boxes differ not only in size and shape but also in style, quality, strength and trimmings. Consequently the equipment for producing such boxes has heretofore consisted mainly of simple, inexpensive hand-operated devices. Although such devices are an aid to a skilled operative and enable a greater output to be attained than if purely hand manipulation is resorted to, the output of each operative even when using such devices depends, in the last analysis, upon the human element, namely, upon the good will and skill of the operative.

Taking into consideration the above conditions, the principal objects of the present invention are to provide equipment for the paper box factory that will fill the gap between the completely automatic machine and the hand methods, to enable the small factory to secure at a relatively low cost a semi-automatic machine possessing in a large measure the advantages of the speed and accuracy of the completely automatic machine, while at the same time having the advantage of the flexibility of the hand methods, which machine can also be operated by comparatively unskilled help, and will not require large expenditures for interchangeable parts or the time of skilled mechanics to change over from one size of box to another.

A further object is to improve upon the construction of the machine shown in our co-pending application for patent Serial No. 143,320 filed October 22, 1926 of which this application, with respect to certain features is a continuation in part.

In accordance with the present invention we provide an installation which includes means for performing the application of adhesive to a strip or strips of paper preferably fed from a roll or rolls in web form to the mechanism which performs the wrapping operation. Instead of the box blanks being fed to the machine automatically and in a flat condition, as in the completely automatic machine, with the present invention the blanks, in folded condition, are placed by hand by the operative upon a form or core, after which a foot pedal or other manually operable device is actuated by the operator to cause the box wrapping mechanism to perform its complete cycle of operations. As such mechanism performs its functions, the paper is fed by an intermittent feeding device that engages the gummed side of the web of wrapping or stripping paper and a strip severing means is actuated in predetermined timed relationship with the wrapping mechanism to sever from the web a piece or strip of paper of the proper length for the box to be wrapped. The successful operation of the automatic machine, as well as the present invention, depends in a large measure upon the presentation of the strip with the adhesive thereon to the machine in such condition that when the gummed strip is applied to the blank, the adhesive will be in the proper "tacky" condition to adhere properly to the blank. In order that this condition be attained it is the practice to apply the adhesive to the web of stripping paper at a certain distance from the wrapping mechanism so that a certain time interval will elapse between gumming and applying to permit the gum to set partially; a length of gummed paper therefore being threaded in the installation between the gummer and box wrapper and being in effect stored for a time to permit the conditioning of the gum and paper and to have it ready for use in the box wrapper.

The completely automatic machine of the type shown in the patent hereinbefore referred to, operates continuously, but the machine of the present invention is necessarily operated irregularly, that is to say, with the former the time interval which elapses between the applying of the adhesive and the attaching of the gummed paper strip to the box blank is always the same, whereas with the semi-automatic machine of this application, said time interval will vary considerably due to the fact that the placing of the box blank upon the form and the actuation of the foot pedal or other device which causes the box wrapping mechanism to start functioning is performed manually. Furthermore, as the operative must, from time to time, remove a pile of finished boxes, or secure a new supply of box blanks, there are times when the time interval between the gumming and applying of the strip will be of relatively long duration.

The compensation which necessarily had to be made for this irregular operation of the present installation presented a problem of the utmost difficulty, which is not encountered with the automatic machine. In the first place, due to the irregular operation, the feeding of the paper strip to the machine is more jerky and as the paper is soaked with the moisture of the adhesive, the tendency of the paper to be torn by the jerky feeding thereof presented a very serious difficulty. In the second place, the functioning of the various parts, that is, the intermittent feeding device and the strip severing means, and the construction of these parts, had to be so designed that none of the members which contact with the gummed side of the paper could be allowed to remain in contact therewith during the time the machine is stopped, otherwise the paper would adhere to such members and clogging of the machine would result. In either case, that is should the paper be torn, or should the machine clog, it would mean that the supply of paper between the gummer and box wrapper would have to be removed and the paper rethreaded through the machine thereby incurring great loss of time. In view of these factors just mentioned, it is therefore another object of the invention to provide an installation of the type set forth in which the timing of the various mechanisms is so arranged that when the box wrapping mechanism has completed its cycle of operations, the intermittent feeding devices and the strip severing means will be out of contact with the paper, and clogging of the machine will be effectually avoided. Considered in its more specific aspects other objects of the invention are to improve upon the construction of the folding devices by means of which the paper strip is folded around the bottom edge of the box and is gummed to the bottom thereof; to improve upon the means for mounting and adjusting the roller employed for pressing the paper strips into contacting engagement with the sides of the box; to devise a new and improved strip severing means; and to improve upon the paper feeding and web guiding means.

The above and other objects will appear more fully from the following more detailed description and by reference to the accompanying drawings forming a part hereof, wherein Figs. 18 and 19 are front elevations showing the complete installation, Fig. 18 showing the box wrapping, strip severing and intermittent feeding apparatus which comprises the left side or half of the machine, while Fig. 19 shows the continuously operating web feeding mechanism and the gumming devices mounted at the right hand end of the machine; Fig. 20 is an enlarged detail taken on the line 20—20 of Fig. 19, and Fig. 21 is a section on the line 5—5 of Fig. 1.

The installation, shown by way of example in the accompanying drawings will first be described briefly. It includes a suitable support, connected to the main frame of the machine, upon which a web or webs of paper are mounted, preferably in the form of rolls. The web is withdrawn from the roll and passes through a gumming device to a continuously operating web feeding mechanism, which functions to pull the web from the roll and through the gummer. The web then passes to a web tensioner and thence to an intermittent feeding mechanism which pushes the end of the gummed web to the box wrapping mechanism. Located between the intermittent feeding device and the box wrapping mechanism is a strip severing means which is automatically operated, in timed relationship with the wrapping mechanism and the intermittent feeding device, to sever from the web a strip of paper of the proper length to wrap the sides of the boxes. The box wrapping mechanism comprises a block, or core, as it is commonly called, which core is shaped and dimensioned according to the shape and size of the box to be wrapped or stripped. This core has associated therewith means for holding the box blank in position upon the core during the performance of the machine's cycle of operations. As the end of the paper web is fed to the box wrapper, its gummed side is moved, by an automatically operated roller, into engagement with a box blank, which has been placed upon the core by the operative and the core is rotated. During the rotation of the core, said roller holds the web of paper in contact with the sides of the box blank upon the rotating core, thus pressing the gummed strip upon the sides of the blank. During the rotation of the core, the engagement of the web between the roller and blank causes the web to be drawn into the box wrapping mechanism. When the core has nearly completed one revolution, the strip supporting means above referred to is actuated to sever from the web a strip of paper of the proper length to completely cover the sides of the box. At the end of a complete revolution of the core, it advances to a plurality of folding devices which are actuated to fold one edge of the strip against the bottom edges of the box and press it into contact with the bottom.

For convenience and clarity of description, the machine will be described in detail under the following headings:

The box wrapping mechanism—A.
Paper supplying and tensioning means—B.
The intermittent feeding device—C.
The strip severing means—D.
Operation.

*Box wrapping mechanism—A*

(Figs. 1 to 17 inclusive.)

The box wrapping mechanism comprises a main frame consisting of a base 10 and a plurality of brackets 11, 12 and 13, secured to said base and projecting upwardly therefrom for supporting the various mechanisms presently to be described. Rotatably mounted in suitable bearings on the base or lower frame 10 is a main driving shaft 14, having a pulley 15 secured thereto by which the machine may be driven from a line shaft or from an electric motor 16, supported upon a shelf or bracket 17, formed integrally with, or secured to, the base 10.

Mounted in suitable bearings in the brackets 11 and 12 is a tubular shaft 18 (see Figs. 1 and 2,) having detachably secured to the front end thereof a core or form 19; the core is in the shape of a rectangular prism and is dimensioned according to the size of the boxes to be wrapped. Mounted within the tubular shaft is a solid shaft or rod 20, which has secured to its front end an ejecting plate 21. The shaft 20 is supported at its ends by bushings or sleeves 22, 23, which are interposed between said shaft and the tubular shaft 18. The tubular shaft 18 has slidably secured thereto an intermittent gear 24 having a sleeve-like extension 24ª which passes through and is rotatably mounted in a bearing formed adjacent to the upper end of the bracket 12. Meshing with the gear 24 is a co-operating, intermittent gear 25, secured upon a cam shaft 26; said cam shaft being rotatably supported in suitable bearings, provided in the brackets 11 and 12, below the tubular shaft 18. Secured to the cam shaft 26 adjacent to the bracket 11 is a gear 27 which meshes with and is driven by the gear 28, mounted upon a jack shaft 29, said jack shaft being driven from the main shaft 14 by means of the gearing 30.

Mounted upon the cam shaft 26 is a main cam 31, provided with a cam groove 32, in which is engaged a roller 33. The roller 33 is mounted on an oscillating lever 34, between the ends of said lever. One end of the lever 34 is pivotally mounted at 35 upon the frame 10 and the upper end of said lever is provided with an elongated guideway 36. Slidably mounted in the guideway 36 is a bearing block 37, in which is rotatably mounted a pin or roller 38, projecting laterally from a sleeve 39 loosely mounted upon the tubular shaft 18, and held against movement longitudinally of said shaft, by means of a pair of spaced collars 40.

A second cam 41 is secured upon the outer projecting end of the cam shaft 26. This cam is in the form of a crank arm and is provided at its outer end with a cam face 42, adapted to engage at certain parts of its revolution with a cam roller 43. The cam roller 43 is secured within a laterally projecting arm 44, formed integrally with the bushing 23 hereinbefore referred to. A spring 45 is mounted within the tubular shaft 18 and is coiled about the shaft or rod 20. This spring has one end thereof in engagement with the inner end of the bushing 23 and its other end in engagement with an abutment 46, fixed within the tubular shaft 18, thus serving normally to urge the rod 20, with the ejecting plate 21 thereof, towards the left in Fig. 2 of the drawings. In this position it will be noted that the ejecting plate 21 is in alignment with the front end of the core.

Suitably secured to the front end of the tubular shaft 18 and held fixed against movement relatively thereto, is a bracket 50, having a pair of diametrically opposed bearing bosses 51, in each of which is mounted a pivot pin 52. Each pivot pin 52 serves as a pivotal support for a lever 53, both ends of which are yoked. One of these yoked ends, as will be seen from Fig. 1, straddles the boss 51 and the other yoked end carries a pin 54$^a$, the ends of which project outwardly beyond the sides of the yoked lever for a purpose which will presently appear. Between the yoke jaws of the lever said pin has rotatably supported on it a roller 54. The roller 54 engages with a slide cam 55, secured to the bushing 22, which bushing as heretofore described is secured to the sliding shaft or rod 20. Secured to the yoked end of the lever 53, which straddles the boss 51, is a bar 56, preferably provided with a plurality of spaced holes 57, in which the finger carrying arms 58 are adapted to be secured by any suitable means, such as the bolts 59. Each of the finger carrying arms 58 carries at its outer end a gripping finger 60, which fingers are adapted, in certain positions of the core, to project over the inner ends of the sides thereof and engage with a box blank placed upon the core. In order to insure that the gripping fingers 60 will engage the box blank with sufficient force to hold said blank securely upon the core 19 the similarly located projecting ends of the pins 54$^a$ carried by the forward ends of the levers 53 are connected by tension springs 54$^b$, said springs also serving to hold the rollers 54 in engagement with the slide cams 55. When the slide cams 55 move rearwardly due to the roll 43 falling off the segment 42, the rollers 54 are forced by the springs 54$^a$ to follow the drop of the cams. The parts are so constructed that before the rollers reach the lowermost points of the cams the fingers 60 will engage the box blank, the springs 54$^b$ thus holding said fingers under tension and in engagement with the blank. In order to adjust the position of the gripping fingers 60 relatively to the tubular shaft to compensate for cores of different sizes, the finger carrying arms 58 are provided at their outer ends with an elongated head 58$^a$, having a plurality of spaced holes 58$^b$ therein, and the fingers 60 are secured to a bracket 61, which in turn is secured by means of a screw 61$^a$ adapted to be screwed into one of the spaced holes 58$^b$.

Figure 1:
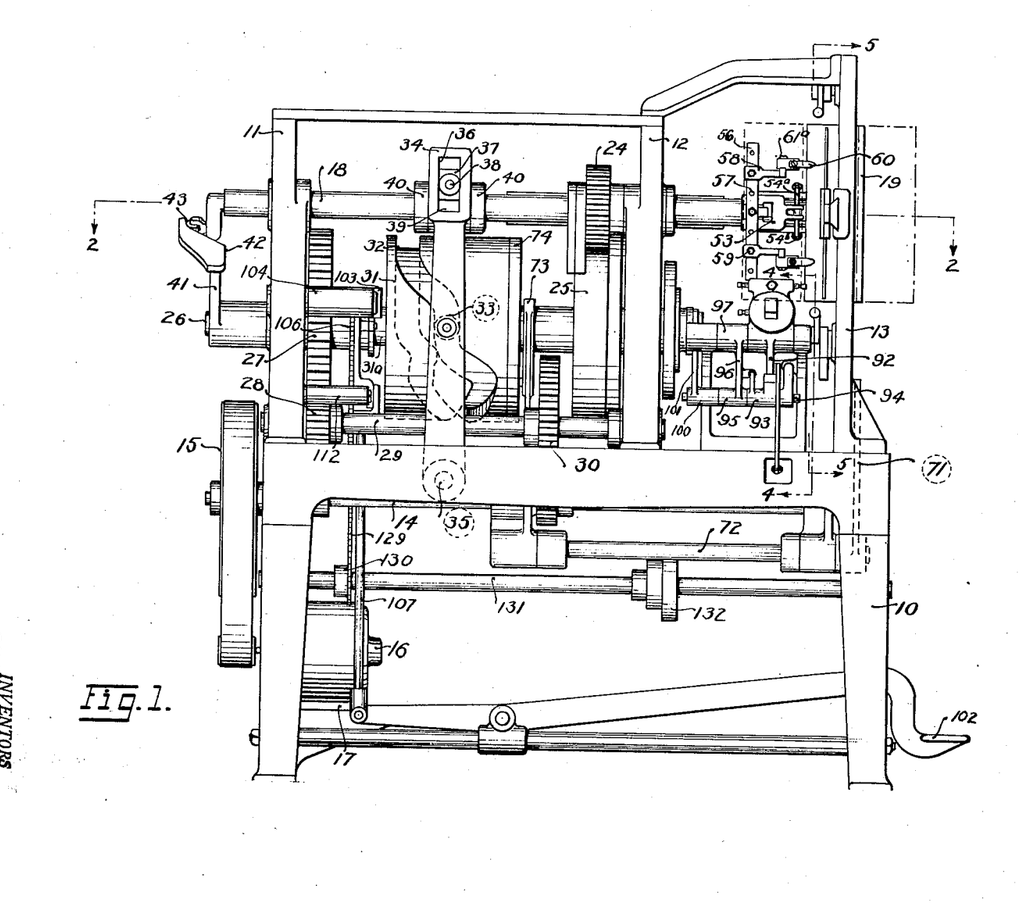
Fig. 1 is a side elevation of a machine constructed in accordance with the principles of our invention.
Figure 2:
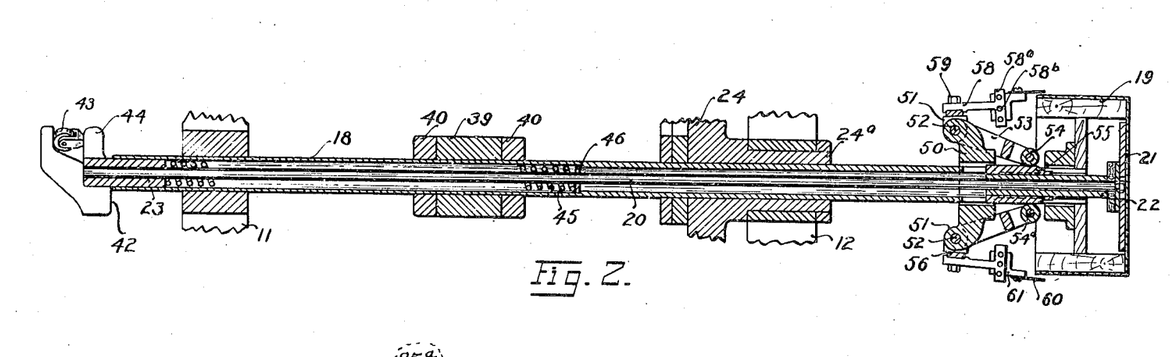
Fig. 2 is a sectional detail taken on the line 2—2 of Fig. 1.
Figure 3:
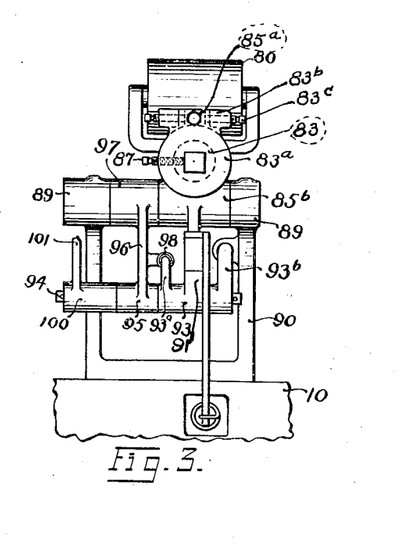
Fig. 3 is a detail side elevation of the means of pressing the paper strip into contact with the sides of the box.
Figure 4:
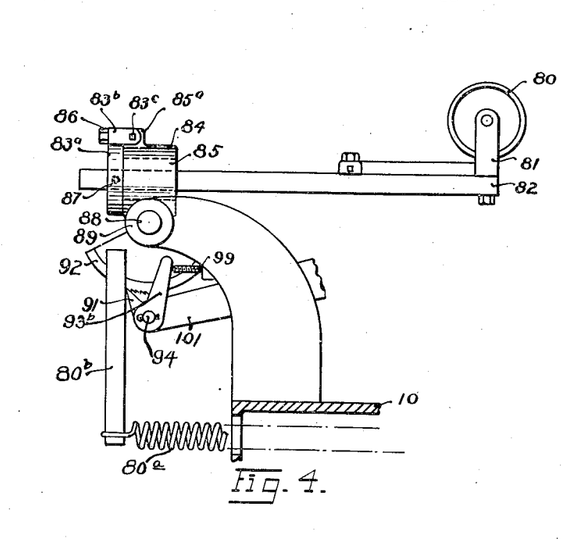
Fig. 4 is a front elevation of the structure shown in Fig. 3.

The folding devices hereinbefore referred to, by means of which the projecting edge of the strip of paper is folded about the bottom folded corners of the boxes, comprise the following parts: The bracket 13, which, as shown in Fig. 1, is mounted at the extreme front end of the machine is in the form of a rectangular open framework, see Fig. 5, through which the core 19 is adapted to be moved by the longitudinal sliding movement of the tubular shaft 18, such movement being effected by means of the cam 31, oscillating lever 34 and associated parts. The folding devices per se, in accordance with the present invention, consist of a pair of rollers 62, mounted, as shown most clearly in Fig. 5, at opposite sides of the framework 13. It will be noted that these rollers are approximately equal in length to the distance between the inner faces of the vertical sides of the framework 13, and they are carried in bracket arms 63, secured to a bar 64; the latter being fastened to the slotted piece 65, which is clamped to the slide 65$^a$, mounted in suitable guideways formed in the rectangular framework. The rectangular frame 13 is preferably hollow and carries in each of its sides a slide block 66. Each of these slide blocks is provided with a cam race 67, with which is engaged a roller carried by the slide 65$^a$.

Figures 5, 7:
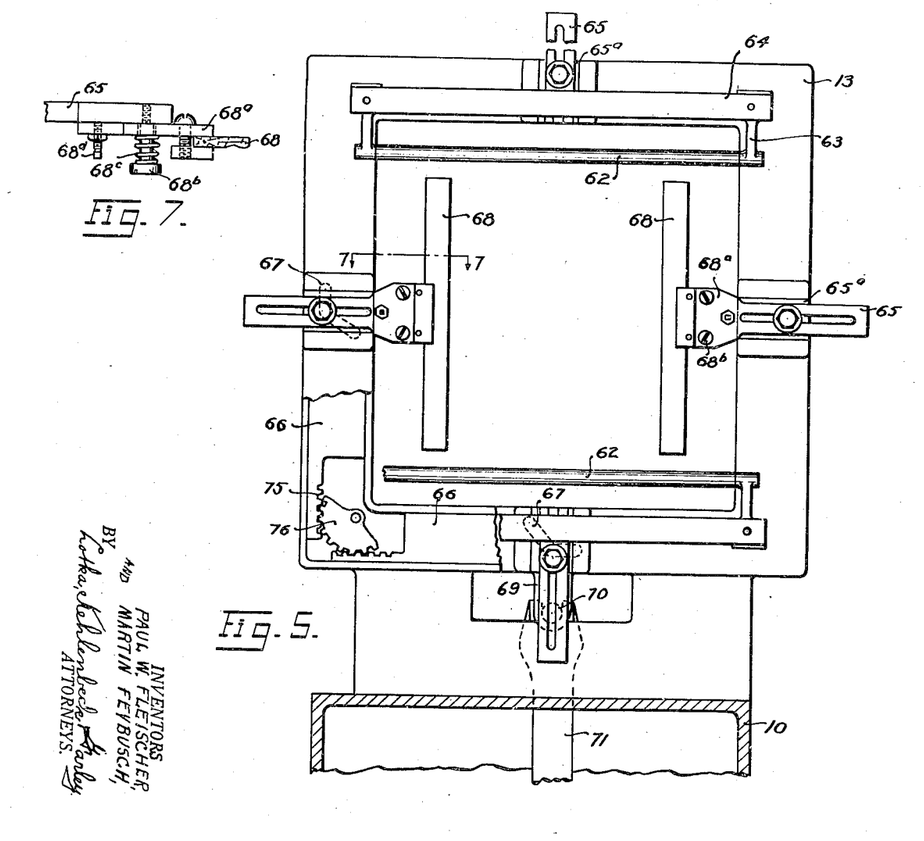
Fig. 5 is an enlarged rear view of the folding devices, as seen from the line 5—5 of Fig. 1, with the parts of the machine being broken away and the lower framework being shown in section.
Fig. 7 is a cross sectional detail taken on the line 7—7 of Fig. 5.
Figure 6:
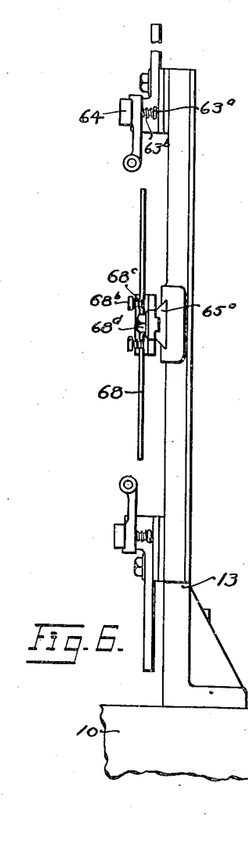
Fig. 6 is a side elevation of the structure shown in Fig. 5.
Figure 8:
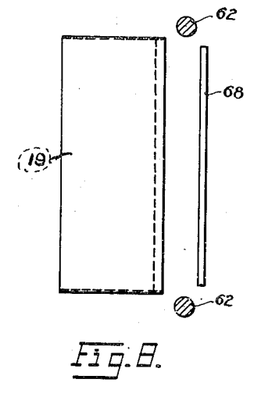
Figs. 8 to 12 inclusive are side elevational diagrams showing the manner in which the paper strip is folded about the edge of the box and pressed into contact with the bottom thereof.

Those two sides of the frame 13 which extend at right angles to the sides that carry the rollers 62 have supported thereon a pair of folding devices which are in the form of flat bars 68, which bars, as clearly shown in Fig. 5, and also in Figs. 8 to 17 of the drawings, extend between the rollers 62 and at right angles thereto. It will thus be seen that four folding devices are provided, two of which are in the form of rollers and two in the form of folding blocks, the rollers being arranged in opposed relationship to engage and fold over the edges of the paper strip on opposite sides of the box and blocks engaging the strip on the other two opposite sides of said box. These four folding devices, one for each side of the box, are intermittently actuated in proper timed relationship with the other parts of the machine, by a mechanism of the type disclosed in the patent to Feybusch et al., hereinbefore referred to. Such mechanism comprises the slide blocks 66, one for each folding device, each block having a cam slot or race 67, with which is engaged a pin or roller secured to the slide portion 65$^a$ of each folding device. The lower folding device 62, which in the particular example herein disclosed, is illustrated as a roller, has its slide block 66 provided with an extension 69, having secured thereto a roller 70. The roller 70 engages within the upper yoked end of an oscillating lever 71, the lower end of which is secured to a rock shaft 72, (see Fig. 1), actuated by a cam yoke 73 and cam 74, the latter being secured to the cam shaft 26. The oscillation of the lever 71, produced by means of the cam 74 and associated parts will cause the lower slide block 66 to be reciprocated horizontally within its guideways and the movement of the lower block is communicated to the entire set of four blocks through rack and gear connections 75, 76, provided between adjacent corners of each pair of blocks 66, as shown in Fig 5 at the lower left hand corner of the rectangular frame 13.

In order to secure the best possible functioning of the folding devices 62 and 68, each of said devices is resiliently mounted upon its respective slide 65, in such a manner that a yielding pressure will be exerted thereby to press the edge of the paper strip against the bottom of the box. With the rollers 62 this is accomplished by mounting the arms 63 slidably upon headed pins or bolts 63$^a$ and providing springs 63$^b$ between the heads thereof and the bar 64, for exerting a pressure against said arms in the direction in which the roller presses on the bottom of the box blank. The folding blocks 68 are secured in clamp members 68$^a$, see Fig. 7, slidably mounted on a pair of headed bolts 68$^b$ similar to the bolts 63$^a$, said bolts being provided with springs 68$^c$ similar in construction and function to the springs 63$^b$. In addition, a limiting or stop bolt 68$^d$ is provided for each clamp 68$^a$.

As hereinbefore set forth in the brief description of the machine, the paper strip 70 has its gummed side moved into engagement with the box blank by means of an automatically actuated roller. This roller is most clearly shown in Figs. 3 and 4 of the drawings and is indicated by the reference character 80. It is rotatably mounted between the arms of a yoke member 81, the latter being secured at the outer end of a bar 82. The bar 82, which, as clearly shown in Fig. 3 of the drawings, is of rectangular cross section, is mounted for longitudinal, sliding adjustment within the rectangular bore of a sleeve or bushing 83, mounted for rotatable adjustment in the boss 84 of an oscillating bracket 85. The sleeve 83 is provided with an enlarged end or head 83$^a$, having formed integrally therewith at its upper end a pair of transversely spaced lugs 83$^b$, each of said lugs having screwed therein an adjusting set screw 83$^c$. The ends of said set screws are adapted to engage with a lug 85$^a$, projecting upwardly from the top of the bracket 85. A locking bolt 86 is screwed into the lug 85$^a$ and passes through an elongated slot in the upper end of the enlarged head 83$^a$ of sleeve 83 and serves to lock said sleeve in adjusted position. For the purpose of securing the bar 82 in adjusted position longitudinally of the sleeve 83, a set screw 87 is provided. The oscillating bracket 85 is provided with a depending boss 85$^b$, which extends transversely of the boss 84 and is mounted upon a shaft 88, supported in bearings 89, provided at the upper ends of the arms of a yoked shaped bracket 90, the latter being secured to base 10. The oscillating bracket 85 is normally urged in a counter-clockwise direction, Fig. 4, to hold said roller 80 in engagement with the core 19, by the action of a coiled tension spring 80$^a$, one end of which is secured to the lower end of a rod 80$^b$, secured to a ratchet segment 92 presently to be described. At predetermined intervals the bracket 85 is intermittently actuated from the cam shaft 26 by means of a pawl 91, which engages with the ratchet segment 92, the latter being formed integrally with the oscillating bracket 85, and depending from the boss 85$^b$ thereof. The pawl 91 projects from a boss 93, rotatably mounted upon a short shaft 94, carried in a bearing 95 of a bracket 96, supported by means of the boss 97 upon the shaft 88, this shaft being the one upon which the transverse boss 85$^b$ of the oscillating bracket 85 is mounted. The boss 93 has a pair of upwardly projecting arms 93$^a$, 93$^b$, the arm 93$^a$ having secured thereto one end of a spring 98, the other end of which is secured to a lug projecting laterally from the bracket 96, and said spring serving to hold the pawl 91 normally in engagement with the ratchet segment 92. The arm 93[b] just referred to is adapted to engage with an adjustable stop 99, secured in the bracket 90, to cause the pawl 91 to become disengaged from the ratchet segment at proper predetermined times. The short shaft 94 passes through a boss 100, at the lower end of a cam yoke 101, the upper end of which is in engagement with the cam shaft 26 and is caused to be oscillated by means of a cam and roller (not shown).

The construction just described enables a very accurate adjustment of the roller 80 relative to the core to be secured and presents a marked improvement over the construction shown in the Feybusch et al. patent. In the patent referred to this roller was mounted on the end of a cylindrical rod which was clamped in place in a split bracket corresponding to the bracket 85. While adjustment of both the rod longitudinally of the bracket and adjustment of the roller about the axis of the bracket could be made in the patented construction, by unscrewing a single nut, such adjustment was quite difficult, because when the split bracket was loosened for the purpose of moving the rod longitudinally only, the weight of the roller tended to cause the rod to rotate about its axis and it was a matter of considerable trouble to secure both the desired longitudinal, and what may be termed, "transverse," adjustment of the roller. With the present construction, longitudinal adjustment of the rod 82 may be effected by loosening the set screw 87 without disturbing the alignment of the periphery of the roller 80 with the core; the square cross section of the rod preventing any rotation of such rod about its axis. If it is desired to make an adjustment by rotation of the rod about its axis, this can be done without disturbing the longitudinal adjustment thereof by loosening the lock bolt 86 and manipulating the set screws 83[c] to cause a rotation of the sleeve 83 within the boss 84 in a manner which will be readily understood.

Figures 19, 20, 21:
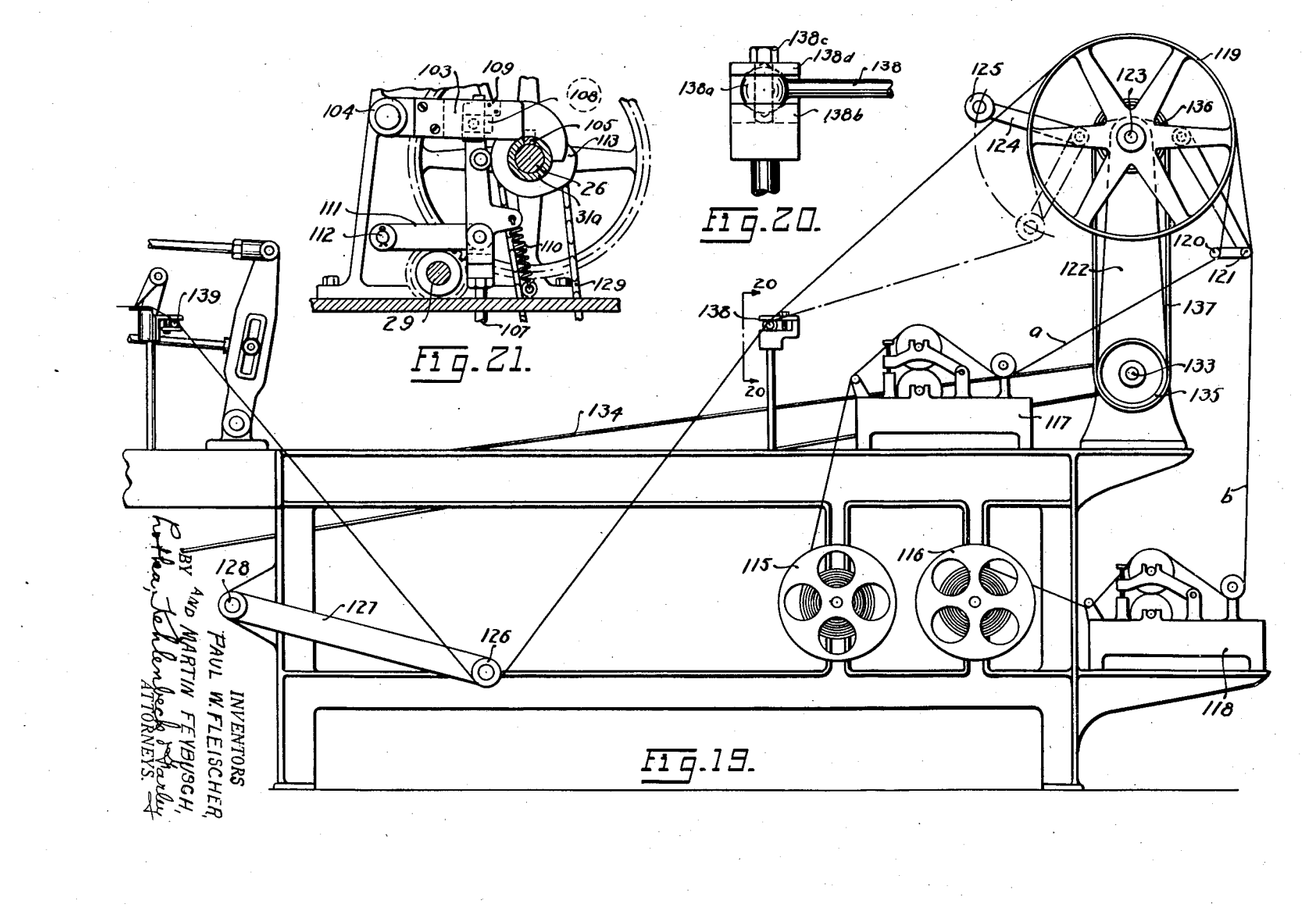

The main shaft 14 of the machine is preferably rotated continuously and the actuation of the various parts is effected from the cam shaft 26. Rotation of the cam shaft is controlled by a one revolution clutch which is adapted to be thrown into operation by the depression of the pedal 102. After the cam shaft has completed a full revolution, during which the box wrapping devices have performed their full cycle of operation the clutch is caused to be automatically disengaged. As shown in Figs. 1 and 21 the one revolution clutch is a clutch of the knife-edge type and consists of an arm 103, one end of which is pivotally mounted upon a laterally projecting boss 104 of the bracket 11. The other end of said arm is adapted to rest by gravity upon the periphery of a boss of the cam 31; the free end of the arm being curved to fit about said periphery. The curved end of the arm 63 is wedge or knife shaped and is adapted to engage a pin or key 105 slidably mounted within the boss 31.[a] A spring (not shown) normally urges the key 105 outwardly to said boss and into engagement with a recess provided in a sprocket 106 secured to the gear 27 by which gear the cam shaft is driven by the gear 28. When the wedge-shaped outer end of the curved arm 103 is in its lowermost position as shown in Fig. 21 it engages within a slot or groove of the key 105 to cause the key to be moved out of engagement with the sprocket thereby uncoupling the clutch. The placing of the clutch in operative condition is brought about by depressing pedal lever 102. Said lever 102 has connected to its inner end, the lower end of a connecting rod 107, the upper end of which has secured thereto a laterally projecting block 108 adapted to engage a cooperating block 109 which projects laterally from the side of the arm 103. A spring 110 has one end thereof anchored to the frame work of the machine and the other end connected with the connecting rod 107 and tends to hold the rod 107 in its lowermost position, in which position the knife-edge of the arm 103 is in engagement with the key 105.

In order to prevent the continuous operation of the machine even though the operator may hold the pedal 102 depressed, and to insure that the one revolution clutch will function to stop the rotation of the cam shaft upon completion of the full cycle of operation of the wrapping devices, the rod 107 is supported for transverse swinging movement upon a link 111 one end of which is pivotally connected to said rod and the other end of which is pivotally mounted in a laterally projecting boss 112 of the bracket 11. A cam 113 is secured to the cam shaft 26 for engagement with a roller 114 projecting laterally from the rod 107 above the point of the pivotal connection therewith of the link 111; the throw of the cam 113 engaging the roller 114 and moving the rod 107 so that the block 108 on said rod will be moved out of alignment with the block 109, thereby insuring that the knife-edge of the arm 103 will be in position to cause the disengagement of the clutch when the cam shaft completes its full revolution.

Operation of the knife clutch will be readily understood, depression of the pedal 102 by the operator causing the member 103 to be raised out of contact with the sliding key 105 and allowing the key to be forced by the action of its spring into the recess of the sprocket 106 thereby to lock cam 31, which is secured to the cam shaft 26, and the sprocket 106 together and to cause the cam shaft 26 to be rotated. As the cam shaft completes its revolution, the wedge shaped end of the arm 103 engages the key and forces it against the action of this spring to cause the clutch to be disengaged. If the operator holds the pedal 102 depressed until after the cam shaft has completed its revolution the operation of the cam 113 will insure the stopping of the cam shaft at the end of the machine's cycle, and, in order to cause the machine again to become operative, it will be necessary for the operator to release the pedal and then depress it again before the clutch can be coupled.

*Paper supplying and tensioning means—B*

The paper web may be fed to the machine as a single strip of paper or if it is desired to give the box a distinctive appearance, two strips of paper of different colors may be provided, one of which slightly overlaps the other, or one of which may be a narrow strip laid on as a stripe. In Fig. 19 we have shown the machine as being provided with two strips or webs of paper, *a*, *b*, which strips are led from rolls supported in the reels 115, 116 respectively, and are led through the gumming devices 117, 118, respectively and over a paper feeding drum 119, of relatively large diameter. Guides 120, 121 are provided for the webs *a* and *b* respectively, said guides being suitably supported from the standard 122 in which the shaft 123 of the drum 119 is mounted. In order to insure that the paper webs will be fed by the drum 119, in accordance with the demand for paper by the box wrapping machine, the following mechanism is provided: Pivotally mounted for adjustment upon a lateral extension of the standard 122 is a roller supporting arm 124, carrying at its outer end a roller 125. A follower roll 126 is mounted at the free end of an arm 127, the other end of which is pivotally supported upon a stud or pin 128. When the feed drum 119 has delivered a larger amount of the web than has been taken up by the box wrapping machine, the follower roll 126, engages a suitable stop thus releasing the tension upon the paper and thereby the frictional contact thereof with the drum 119. The drum 119 is driven from the box wrapping machine by the following means: The sprocket 106, see Fig. 1, with which the key 105 of the knife-edge clutch engages, has trained about it a chain 129, which drives a sprocket 130 mounted upon a counter shaft 131, journaled in the lower frame of the box wrapping machines. Secured upon the counter shaft 131 is a step cone pulley 132. Trained about the pulley 132 and a pulley secured to a shaft 133, (Fig. 19,) journaled in the standard 122, is a belt 134, which causes the shaft 133 to be driven from the box wrapping machine. Secured to the shaft 133 is a second pulley 135 above which is a pulley 136, secured to the drum shaft 119. About these pulleys is trained a belt 137 for driving the drum from the box wrapping machine. As the paper passes from the drum 119 to the intermittent feeding device it is trained over guides 138 and 139 which are of similar construction and consist of a laterally extending arm suitably supported from the framework. Each arm is preferably provided with a ball shaped end 138ª clamped between a pair of recessed plates 138ᵇ, said plates being clamped in engagement with the end 138ª by a bolt 138ᶜ. The ball shaped end of each rod co-operates with the recessed plates to permit universal adjustment of the arms 138, 139. By inclining such arms as required, the paper can be made to track true, and so that sidewise creeping thereof can readily be prevented. It will be understood that the arms 138, 139 are oppositely arranged, that is with the ball end of the arm 138 located adjacent to one side of the frame while the ball end of the arm 139 is at the other side of the frame.

*Intermittent feeding device—C*

In its passage from the paper supply to the box wrapping mechanism the web is engaged and fed to the wrapping mechanism as required by an intermittent feeding device, which may be of any suitable construction, but which as shown, comprises the following parts: Adjustably mounted upon a sub-frame 140, extending laterally from the main frame 10 is a table 141, any suitable adjusting devices, such as the screws 142, connected for simultaneous movement by the sprocket chain 142ª being provided for moving the table vertically. Mounted on a suitable guide 141ª, provided upon the table 141, is a slide 143, carrying a paper gripping member 144, mounted for limited oscillation upon said slide by means of a rocking arm 145. The rocking arm 145 is connected by a rod 146 with an oscillating lever 147 pivotally mounted at its lower end as at 148. One end of an actuating rod 149 is connected to the oscillating lever between the ends of said lever, the other end of said rod being supported in any suitable manner, and being provided with a roller which engages with a cam 150, secured to the cam shaft 26, which cam is provided with a cam race of suitable contour for causing the paper gripping member 144 to be oscillated and the slide 143 reciprocated in properly timed relationship with the rotation of the box core 19 to feed the paper to said core.

*Strip severing device—D*

For severing from the web the strip of paper which is to be secured to the box, we have shown a device which includes a reaction block or plate 151 of hardened steel, secured to the front end of the table 141. A chopping blade 152 is mounted, for movement into and out of contact with the plate 151, at the free end of one arm of a two armed lever 153, pivotally supported, as at 154, in a bracket 155, mounted on the table 141. The other end of the two armed lever has connected therewith one end of a connecting rod 156, the other end of which rod is connected with one end of a bell crank lever 157, the other end of which carries a cam roller 158, held in contacting engagement, by any suitable means, with the periphery of a cam 159, secured to the cam shaft 26.

*Operation*

Figure 9:
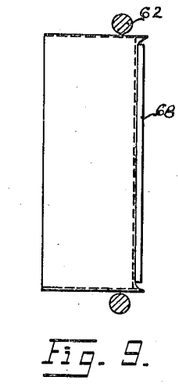
Figure 10:
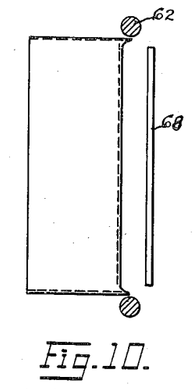
Figure 14:
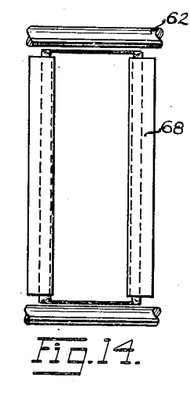
Figure 15:
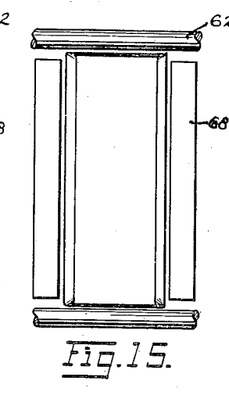
Figure 16:
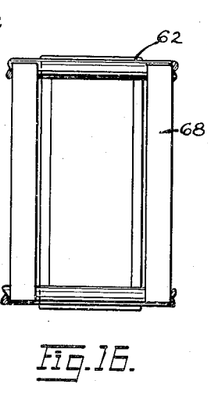
Figure 17:
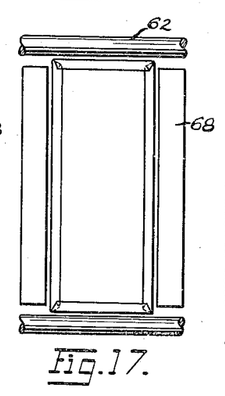

It will be understood that before a job is started upon the machine, a core 19 of the proper size and shape is secured to the hollow tubular shaft 18 and that the folding devices and other adjustable parts of the box wrapper will be adjusted in accordance with the size and shape of the boxes to be wrapped. At the beginning of a cycle of operations of the machine, the core 19 is in the position indicated by the full lines in Fig. 1. The operator positioned in front of the machine will place a folded box blank upon the core 19, which core it will be understood has, at this time, its sides in parallelism with the folding devices 62, 68. The pedal lever 102 is now depressed by the operator, thus causing the one revolution clutch to become operative to rotate the cam shaft 26. As the cam shaft 26 begins its rotation, the cam 42 moves out of engagement with the cam roller 43, thus permitting the shaft or rod 20 to be moved rearwardly relative to the tubular shaft 18 by the spring 45. When this occurs, the cams 55, (Fig. 2), are moved rearwardly and the rollers 54 ride down off the cams 55, thus permitting the yoked levers 53 and the finger carrying arms 58 to move inwardly and bring the fingers 60 into engagement with the box blank upon the core 19 and to hold said blank securely in position upon said core. Immediately after the fingers 60 grip the box blank, the rotation of the cam shaft 26 causes the tubular shaft 18 to be withdrawn by the action of the cam 31 and associated parts to bring the core rearwardly to the dotted line position shown in Fig. 1, in which position the core is in alignment with the roller 80. The web feeding mechanism C now thrusts the end of a strip of gummed paper between the roller 80 and the box blank upon the core 19, the roller 80 at this time being held, by the pawl 91, against the action of the spring 80$^a$, in its lowered position. The pawl 91 and ratchet 92 is now released by the cam yoke 101, thereby permitting the spring 80$^a$ to actuate the bracket 85 about the shaft 88 in a counter-clockwise direction, thus moving the roller upwardly and holding the gummed side of the paper strip against the box blank. Just as this occurs, the intermittent gearing 24, 25, becomes operative to rotate the tubular shaft. Upon the completion of a full revolution of said shaft, the pawl 91 becomes active to cause the roller 80 to be moved to its lower inoperative position, and the cam 31 becomes operative to move the core 19 forwardly. At the beginning of this forward movement of the core, it is in the relative position to the folding devices 62, 68, shown in Figs. 8 and 13 of the drawings. The forward movement of the tubular shaft and core continues until the front edge of the core and the bottom of the box are in alignment with the folding blocks 68. The contour of the cam groove 32 is arranged to hold the core momentarily in this position. The folding blocks 68 are then moved inwardly to fold the projecting edge of the paper strip around the bottom corner of the box and press such edge into contact with the bottom of the box, as indicated in Figs. 9 and 14 of the drawing. After the pressing of the two edges of the strip into engagement with the bottom of the box has been completed, the folding blocks 68 are retracted to the position shown in Fig. 15, and the cam groove 32 then causes the tubular shaft 18 and core 19 to be withdrawn slightly to the position shown in Fig. 10 of the drawings. The rollers 62 are now moved inwardly towards the tubular shaft by the action of the slide blocks 66, cam slots 67 and associated parts, thus causing said rollers to move from the position shown in Figs. 10 and 15 to the position shown in Figs. 11 and 16, thereby folding the other two projecting edges of the paper strip about the two remaining folded bottom edges of the box blank. The rollers 62 are then withdrawn to the positions shown in Figs. 12 and 17. After this occurs, the tubular shaft 18 and core 19 are caused to be moved by the cam 31 to the extreme forward position indicated by the dot and dash lines in Fig. 1 of the drawings after which the core is retracted to the starting position. Just as the core 19 reaches the extreme forward position, the cam 42 becomes operative to hold the rod 20 against the action of the spring 45 and thereby cause the ejector plate 21 to remain stationary as the core 19 is retracted, thereby stripping the completed box off the core. After the box is removed from the core and the tubular shaft and core are retracted, the cam roll 43 follows the inclined portion of the cam face 42 and comes to rest in the starting position indicated in Figs. 1 and 2 of the drawings. The complete cycle of the machine's operation is now completed and the one-revolution clutch operates automatically to stop the rotation of the cam shaft. All of the parts are at rest in the starting position and will remain at rest until the clutch pedal 102 is again depressed.

With the construction shown in this application, no suction devices are employed, the operation of the gripping fingers 60 being purely mechanical. Therefore, the action of the machine is most positive, and difficulties, due to the use of suction devices, are avoided.

Figure 11:
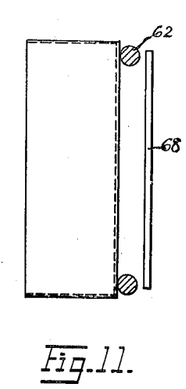
Figure 12:
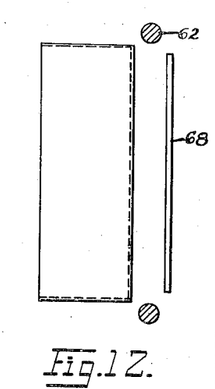
Figure 13:
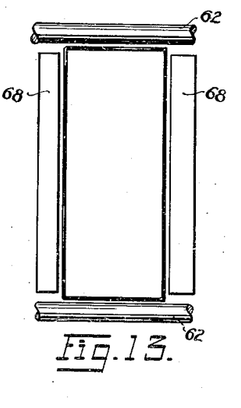
Figs. 13 to 17 inclusive are front elevational diagrams showing the parts in the same sequence of steps as shown in Figs. 8 to 12.

The employment of the pair of rollers 62 in combination with the folding blocks 68 insures the production of a better product. As only two rollers 62 are used, they may be made longer than the side of the box upon which they operate. The blocks 68 may therefore be made a trifle shorter than the sides of the box, with which the latter cooperate. As the roller moves across the bottom of the box, as indicated in Fig. 11, the action of the rollers not only completes the adhesion adjacent to the corners of the box, of the ends of the two side strips, upon which the blocks 68 have operated, but in addition, the edges of the strips at the other two sides of the box may be made to overlap the first mentioned strips and the rollers 62 press the overlapping edges thereof down into contact with and upon said first mentioned strips. This is a very important advantage over the construction shown in the Feybusch et al. patent, in which four folding blocks were employed, because in the patented construction the folded edges were not as efficiently secured adjacent to the corners as with the present construction. In addition, the use of the two long rollers simplifies the changing over of the machine from one job to another, it being necessary to change two folding blocks only, instead of four.

The use of a wooden block for the rotating core and also the use of wood for the two folding blocks 68 eliminates the necessity for comparatively high expenditures for interchangeable metal parts, as the core and folding blocks for any particular size or style of block may be sawed out and attached to the box wrapper in a few minutes by comparatively unskilled help. As a result the installation herein disclosed is fully as flexible with respect to its use for many different sizes and shapes of boxes as the crude hand devices of the prior art.

The steps performed by the box wrapper per se being performed automatically no especial skill is required of the operative, all that is required being that the operative place the box blank properly in position on the core and then depress the pedal, and the mechanism proceeds to perform its functions, the result will be the delivery by the box wrapper of a properly wrapped, or stripped, box, the product secured being in fact greatly superior to that which can be obtained by hand work, not only with respect to the appearance of each box but also in the uniformity of results secured in an entire job or lot. In addition, the amount of production or output per operative is speeded up and closely approximates the production rate obtained by the use of the entirely automatic machine.

In the operation of the mechanism hereinbefore described, three materials, namely box blanks, adhesive and stripping paper are supplied. The first being fed intermittently at irregular time intervals, and the average rate of feed thereof governing, in effect, the rate of feed of the two last named materials. From the standpoint of efficient operation it is necessary, in order to secure uniform coating, that the adhesive be applied to the stripping paper substantially continuously and, in order that both paper and adhesive may have time to "season or condition", within predetermined time limits in advance of the application of the adhesive coated paper to the box blank.

Figure 18:
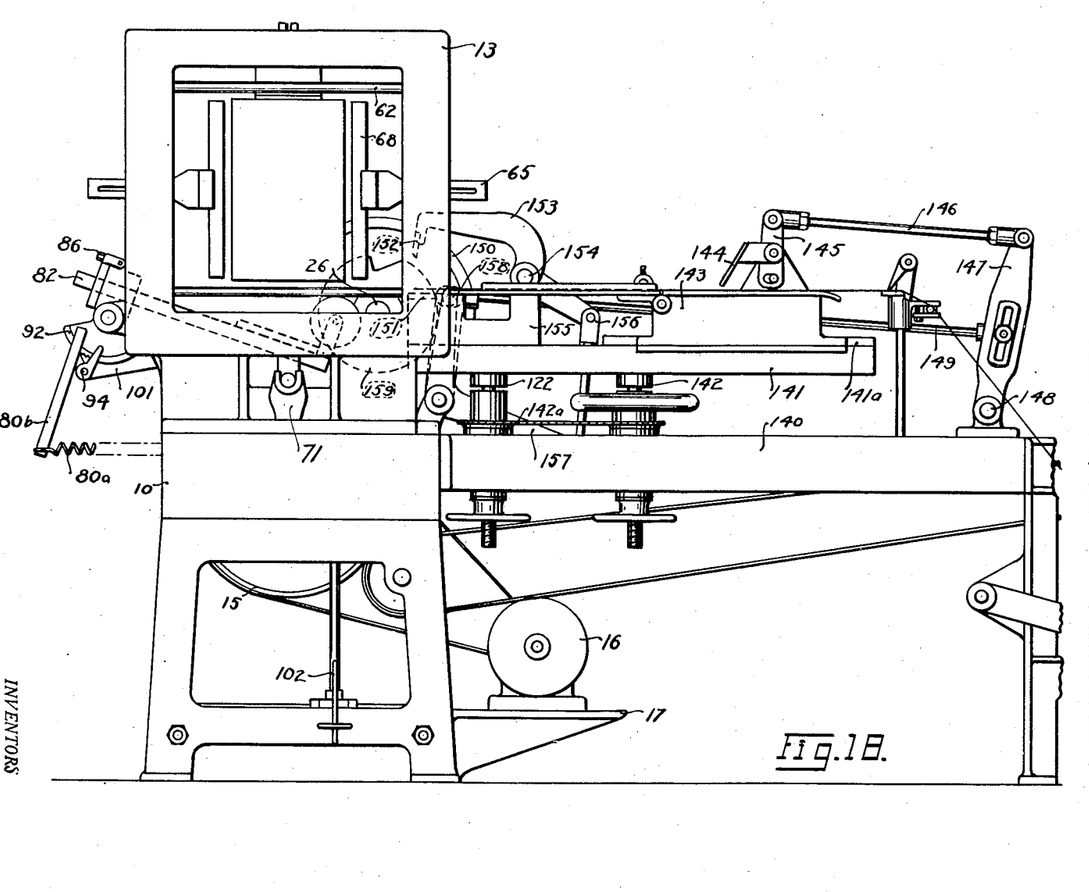

The continuous application of the adhesive is effected by the paper being pulled through the gum applying devices by the continuously operating drum 119 and although the continuity of feed may at times be interrupted automatically when the tension on the paper is released due to the bight roller 126 reaching its lowermost position of travel, the arm 124 and roller 125 may be adjusted with such a degree of accuracy that, in the normal operation there is no stoppage of the paper feeding through the gummers except when the operative must leave the machine to secure a new supply of blanks. The construction and arrangement of the parts not only provide compensation for the substantially continuous irregular operation of the box wrapper but also for the stopping thereof for the relatively longer intervals which occur when the blank supply must be replenished or finished boxes removed. Such compensation is effected by establishing a definite predetermined timed relationship in the operation of the various elements which form the complete installation, which relatioushipq differs materially from that of the complete automatic installation, and which is such that when the one revolution clutch operates automatically to stop the cam shaft 26 of the box wrapper upon the completion of its cycle, all of the intermittently actuated parts which engage the gummed side of the paper are held out of engagement therewith and as a result there will be no adhesion of the gum to such parts during the time the mechanism is stopped. This relationship is shown in Figs. 18 and 19 from which it will be noted that the intermittent feed member 144 and the strip severing member 152 are out of contact with the paper. The construction and operation of the latter element also form important factors in the successful operation of the installation, the member 152 having, due to the quick snappy blow which it strikes, but an instantaneous contact with the gummed paper strip, consequently there is no adhesion of gum to such member.

While the embodiment of the invention herein disclosed is a satisfactory constructional example thereof which has been put in successful commercial operation, it will be understood that the principles of the invention are not limited to the specific constructional details illustrated but that many changes, variations and modifications may be made without departing from the spirit of the invention.

We claim:

1. In a paper box making machine, a rotatable core, means to rotate said core, a roller for holding a gummed strip of paper in engagement with a box blank on said core as it is rotated, a rod upon which said roller is mounted, means for moving said rod to different longitudinal adjusted positions, and means independent of said last named means to adjust said roller about the axis of said rod.

2. In a paper box making machine, a rotatable core, means to rotate said core, a roller for holding a gummed strip of paper in engagement with a box blank on said core as it is rotated, a rod, upon which said roller is mounted, having a rectangular cross section, a bracket having a bore of similar cross section to that of said rod and in which said rod is slidably mounted, means to hold said rod in different longitudinal adjusted positions, and means independent of said last named means for adjusting said roller about the axis of said rod.

3. In a paper box making machine, a rotatable core, means to rotate said core, a roller for holding a gummed strip of paper in engagement with a box blank on said core as it is rotated, an oscillating bracket, a sleeve having a bore of rectangular cross section rotatably mounted in said bracket, a rod upon which said roller is mounted, having a cross section similar to that of the bore of said sleeve, and mounted for longitudinal sliding adjustment within said sleeve, means for locking said rod against movement relatively to said sleeve and means for locking said sleeve against movement relatively to said bracket.

4. In a paper box making machine, a rotatable core, means to rotate said core, a roller for holding a gummed strip of paper in engagement with a box blank on said core as it is rotated, an oscillating bracket, a sleeve having a bore of rectangular cross section rotatably mounted in said bracket, a rod, upon which said roller is mounted having a cross section similar to that of the bore of said sleeve, mounted for longitudinal sliding adjustment within said sleeve, means for locking said rod against movement relatively to said sleeve, and means for locking said sleeve against movement relatively to said bracket, said last named means including projecting lugs upon said bracket and sleeve, adjusting screws in certain of said lugs adapted to abut against another of said lugs, and means additional to said set screws to lock said sleeve against movement.

5. In a box making machine, a shaft mounted for longitudinal sliding and rotational movement, a core, upon which a box blank is adapted to be placed, secured to said shaft, a plurality of levers pivotally connected with said shaft, gripping fingers carried by said levers adapted to be moved into and out of engagement with said box blank, and cam means associated with said levers for moving said gripping fingers.

6. In a box making machine, a tubular shaft mounted for longitudinal sliding and rotational movement, a core secured to said shaft, a rod mounted within said tubular shaft for longitudinal sliding movement relatively thereto, an ejector secured to said rod, gripping fingers pivotally connected with said tubular shaft for movement into and out of engagement with a box blank for holding the same upon said core, and cam means for causing relative movement of said rod to said tubular shaft to move said gripping fingers.

7. In a box making machine, a tubular shaft mounted for longitudinal sliding and rotational movement, a core, upon which a box blank is adapted to be placed, secured to said tubular shaft, a rod mounted within said tubular shaft for longitudinal sliding movement relatively thereto, a plurality of levers pivotally secured to said tubular shaft, cams operatively associated with said rod for engagement with said levers, arms connected with said levers, and fingers carried by said arms for movement into and out of engagement with said box blank by the action of said cam means and levers.

8. In a box making machine, a shaft mounted for longitudinal sliding and rotational movement, said shaft being adapted to have secured thereto cores of different size and shape corresponding to the size and shape of the boxes to be worked upon by said machine, a plurality of fingers, carriers on which said fingers are mounted, said carriers being movable to bring the fingers into and out of engagement with a core, and means for adjusting said fingers on said carriers to compensate for different sized cores.

9. In a paper box making machine, a frame, a standard mounted thereon having a rectangularly shaped opening, a shaft mounted upon said frame for rotatable and longitudinal sliding movement, a core secured to said shaft, means to move said shaft and core longitudinally to a plurality of positions in which they are momentarily held, means for rotating said core when it is held in one of said positions, said core when in said one position being located entirely behind said standard whereby said standard serves as a guard for the rotating core, and said core, when in another of said positions projecting through said opening forwardly of said standard, whereby a box blank may be readily placed upon, or removed from, said core.

10. In a paper box making machine, a main drive shaft, means for rotating said shaft continuously, a cam shaft and driving connections between it and the main shaft including a one revolution clutch, manually operable means for causing said clutch to become engaged, a plurality of devices driven by said cam shaft including a rotatable core upon which a box blank is adapted to be placed, means for feeding a web of paper adjacent to said core, means for rotating said core, means for feeding the end of a web of paper to said core, means for wrapping said paper about said box blank, means for severing a strip of paper from said web, means for folding said strip against the bottom of said box blank and means for disengaging said blank from said core after it has been wrapped; a disengageable connection between said clutch and manually operable means, and means connected with said cam shaft to cause disengagement of said connection and thereby prevent continuous rotation of said cam shaft even though said manually operable means may be held in its clutch engaging position.

11. In a box making machine, a core upon which a box blank is adapted to be placed, a plurality of fingers adapted for co-operation with said core, carriers on which said fingers are mounted, said carriers being movable to bring the fingers into and out of engagement with a box blank located on the core, and means for adjusting said fingers on their carriers in a direction laterally of the blank.

In testimony whereof we have hereunto set our hands.

PAUL W. FLEISCHER.
MARTIN FEYBUSCH.